(12) United States Patent
Natsume (10) Patent No.: US 9,031,390 B2
(45) Date of Patent: May 12, 2015

(54) WIPER DEVICE

(71) Applicant: ASMO Co., Ltd., Kosai (JP)

(72) Inventor: Takashi Natsume, Kosai (JP)

(73) Assignee: ASMO Co., Ltd., Shizuoka (JP)

( * ) Notice: Subject to any disclaimer, the term of this patent is extended or adjusted under 35 U.S.C. 154(b) by 184 days.

(21) Appl. No.: 13/849,550

(22) Filed: Mar. 25, 2013

(65) Prior Publication Data

US 2013/0251352 A1    Sep. 26, 2013

(30) Foreign Application Priority Data

Mar. 26, 2012  (JP) .................................. 2012-069846
Mar. 26, 2012  (JP) .................................. 2012-069847

(51) Int. Cl.
| | |
|---|---|
| *H02P 1/04* | (2006.01) |
| *H02P 1/00* | (2006.01) |
| *H02P 1/22* | (2006.01) |
| *H02P 7/29* | (2006.01) |

(52) U.S. Cl.
CPC ... *H02P 1/22* (2013.01); *H02P 7/29* (2013.01)

(58) Field of Classification Search
USPC ................. 318/266, 268, 443–445, 286, 466; 388/854; 15/250.12; 134/6
See application file for complete search history.

(56) References Cited

U.S. PATENT DOCUMENTS

| | | | | |
|---|---|---|---|---|
| 4,614,903 | A * | 9/1986 | Betsch et al. ................. | 318/443 |
| 5,225,752 | A * | 7/1993 | Yasuda et al. ................. | 318/443 |
| 5,672,946 | A * | 9/1997 | Kawashima et al. ......... | 318/444 |
| 5,861,723 | A * | 1/1999 | Koch ............................ | 318/285 |
| 5,909,096 | A * | 6/1999 | Detais .......................... | 318/282 |
| 5,917,296 | A * | 6/1999 | Frey et al. .................... | 318/268 |
| 6,249,097 | B1 * | 6/2001 | Frey et al. .................... | 318/257 |
| 6,703,804 | B1 * | 3/2004 | Courdier et al. ............. | 318/445 |
| 7,268,507 | B2 * | 9/2007 | Kawamura .................... | 318/364 |
| 7,385,367 | B2 * | 6/2008 | Amagasa et al. ............. | 318/434 |
| 2006/0087267 | A1* | 4/2006 | Kawamura .................... | 318/364 |
| 2006/0202652 | A1* | 9/2006 | Amagasa et al. ............. | 318/434 |
| 2009/0026986 | A1* | 1/2009 | Soleilhac ...................... | 318/286 |
| 2012/0227205 | A1* | 9/2012 | Maier et al. ................ | 15/250.12 |
| 2012/0325265 | A1* | 12/2012 | Amagasa .......................... | 134/6 |

FOREIGN PATENT DOCUMENTS

JP    2011-218998 A    11/2011

* cited by examiner

*Primary Examiner* — Paul Ip
(74) *Attorney, Agent, or Firm* — Solaris Intellectual Property Group, PLLC (57) ABSTRACT

A wiper device that includes: a wiper motor that swings a wiper blade that is coupled to the wiper motor through a wiper arm to-and-fro over a window pane between an upper return position and a lower return position; and a drive component that gradually increases power supplied to the wiper motor until the rotation speed of the wiper motor reaches a specific speed when the wiper motor has been restarted from a stationary state of the wiper blade between the upper return position and the lower return position.

3 Claims, 9 Drawing Sheets

WIPER DEVICE

CROSS-REFERENCE TO RELATED APPLICATIONS

This application claims priority under 35 USC 119 from Japanese Patent Application No. 2012-069846 filed on Mar. 26, 2012 and Japanese Patent Application No. 2012-069847 filed on Mar. 26, 2012, the disclosures of which are incorporated by reference herein.

BACKGROUND OF THE INVENTION

1. Field of the Invention

The present invention relates to a wiper device.

2. Description of the Related Art

Japanese Patent Application Laid-Open (JP-A) No. 2011-218998 discloses a wiper device that prevents a wiper arm from starting up with a jerk when the wiper device is restarted after stopping partway, so as to eliminate a user being disconcerted by jerky wiper action.

However, in the wiper device disclosed in JP-A No. 2011-218998, there is an issue that the action of the wiper arm is sluggish until the wiper blade recovers, since a wiper motor is driven at a start-up speed that is slower than a standard motor speed when restarting.

Moreover, in the wiper device disclosed in JP-A No. 2011-218998, there is also an issue that when restarting, the wiper motor is driven at the start-up speed that is slower than the standard motor speed in normal operation, followed by operation at the standard motor speed after the rotation speed of the wiper motor has reached the standard motor speed. This necessitates complex control requiring an expensive microcomputer.

SUMMARY

In consideration of the above circumstances, an object of the present invention is to provide a wiper device that prevents a wiper arm from starting up with a jerk and in which a recovery action does not appear sluggish to a user when the wiper arm is restarted after a wiper blade has stopped partway across a window pane.

Moreover, in consideration of the above circumstances, an object of the present invention is to provide at low cost a wiper device that prevents a wiper arm from starting up with a jerk when the wiper arm is restarted after a wiper blade has stopped partway across a window pane.

A wiper device of a first aspect includes: a wiper motor that swings a wiper blade that is coupled to the wiper motor through a wiper arm to-and-fro over a window pane between an upper return position and a lower return position; and a drive component that gradually increases power supplied to the wiper motor until the rotation speed of the wiper motor reaches a specific speed when the wiper motor has been restarted from a stationary state of the wiper blade between the upper return position and the lower return position.

When the wiper motor of the wiper device of the first aspect is started from a stationary state of the wiper blade between the upper return position and the lower return position, the power supplied to the wiper motor is gradually increased until the rotation speed of the wiper motor reaches the specific speed. The wiper motor can accordingly be controlled so as to prevent the wiper arm from starting up with a jerk, and also such that the recovery action does not appear sluggish to a user.

A wiper device of a second aspect is the wiper device of the first aspect, further including: a storage component that is stored with a target speed map that specifies a rotation speed of the wiper motor according to the position of the wiper blade, and that is stored with a restart initial speed map that specifies to gradually increase the rotation speed of the wiper motor from 0 to the specific speed; a detection component that detects a rotation speed and a rotation angle of the wiper motor; a wiper switch that is input with an instruction to actuate or stop the wiper motor; and a control component that computes a position of the wiper blade on the window pane from a rotation angle of the wiper motor detected by the detection component, and on receipt of an instruction to actuate the wiper motor from the wiper switch, when the stationary position of the wiper blade on the window pane is between the upper return position and the lower return position the control component controls the drive component so as to gradually increase the power supplied to the wiper motor from the drive component such that the rotation speed of the wiper motor gradually increases up to the specific speed according to the restart initial speed map, and also, after the wiper blade has reached the upper return position or the lower return position the control component controls the drive component such that the rotation speed of the wiper motor becomes a rotation speed according to the target speed map.

According to this wiper device, when the wiper blade is restarted after stopping partway across the window pane, the rotation speed of the wiper motor is increased gradually, thereby preventing the wiper arm from starting up with a jerk, and also making it possible to control the wiper motor such that the recovery action to the return position does not appear sluggish to a user.

A wiper device of a third aspect is the wiper device of the second aspect, wherein the restart initial speed map has different rates of increase in the rotation speed of the wiper motor according to the stationary position of the wiper blade.

According to this wiper device, the wiper arm can be prevented from starting up with a jerk since the rate of increase in the rotation speed of the wiper motor is varied according to the position of the wiper blade that has stopped partway across the window pane.

A wiper device of a fourth aspect is the wiper device of the third aspect, wherein in the restart initial speed map, the rate of increase in the rotation speed of the wiper motor is less the closer the stationary position of the wiper blade is to the upper return position or the lower return position.

According to this wiper device, the wiper blade can be prevented from overrunning beyond the return positions since the rate of increase in the rotation speed of the wiper motor is less the closer the position where the wiper blade stopped partway across the window pane is to the return positions.

A wiper device of a fifth aspect includes: a wiper motor that swings a wiper blade that is coupled to the wiper motor through a wiper arm to-and-fro over a window pane between an upper return position and a lower return position; a storage component stored with a target speed map that specifies a rotation speed of the wiper motor according to the position of the wiper blade between the upper return position and the lower return position, and also stored with a restart target speed map that specifies a rotation speed of the wiper motor between the upper return position and the lower return position that is lower than that of the target speed map; a detection component that detects a rotation angle of the wiper motor; a wiper switch that is input with an instruction relating to actuating or stopping the wiper motor; and a control component that computes a position of the wiper blade on the window pane from the rotation angle of the wiper motor detected by the detection component, and when input with an instruction to actuate the wiper motor from the wiper switch, when the stationary position of the wiper blade on the window pane is between the upper return position and the lower return position the control component controls the rotation speed of the wiper motor according to the restart target speed map until the first time the wiper blade reaches the upper return position or the lower return position from the stationary position, and also, after the wiper blade has reached the upper return position or the lower return position the control component controls the rotation speed of the wiper motor according to the target speed map.

When the wiper arm of the wiper device of the fifth aspect is restarted after stopping partway across the window pane, the rotation speed of the wiper motor is controlled at a low speed according to the restart target speed map until the first time the wiper blade that has stopped partway reaches the upper return position or the lower return position. Moreover, switching from the restart target speed map to the target speed map can be performed by the simple control of determining whether or not the wiper blade has reached the upper return position or the lower return position that can be performed even by a low cost microcomputer. A wiper device that prevents the wiper arm from starting up with a jerk when the wiper arm is restarted after the wiper blade has stopped partway across the window pane can accordingly be provided at low cost.

In a wiper device of a sixth aspect: the target speed map includes a high speed operation target speed map specifying a rotation speed of the wiper motor between the upper return position and the lower return position and a low speed operation target speed map specifying a rotation speed of the wiper motor between the upper return position and the lower return position that is lower than that of the high speed operation target speed map; and the restart target speed map specifies a rotation speed of the wiper motor between the upper return position and the lower return position that is lower than that of the low speed operation target speed map.

According to this wiper device, the rotation speed of the wiper motor can be controlled based on the high speed operation target speed map and based on the low speed operation target speed map, and the wiper arm can also be prevented from starting up with a jerk by controlling the rotation speed of the wiper motor according to the restart target speed map, that has the lowest speed, when the wiper blade has stopped partway across to window pane.

In a wiper device of a seventh aspect: the wiper switch can be input as wiper motor actuation instructions with an instruction to actuate the wiper motor at high speed and an instruction to actuate the wiper motor at low speed; when input from the wiper switch with an instruction to actuate the wiper motor in a situation in which the stationary position of the wiper blade on the window pane is between the upper return position and the lower return position, the control component controls the rotation speed of the wiper motor according to the restart target speed map until the first time the wiper blade reaches the upper return position or the lower return position from the stationary position; and after the wiper blade has reached the upper return position or the lower return position, the control component respectively controls the rotation speed of the wiper motor according to the high speed operation target speed map when the input instruction was an instruction to actuate the wiper motor at high speed, and according to the low speed operation target speed map when the input instruction was an instruction to actuate the wiper motor at low speed.

According to this wiper device, when the wiper arm is restarted after stopping partway across the window pane, the rotation speed of the wiper motor can be controlled according to the restart target speed map that has the lowest speed until the first time the wiper arm reaches the upper return position or the lower return position from the partway stationary position, when the wiper switch is switched to a high speed operation position and also when the wiper switched is switched to a low speed operation position. The wiper arm can accordingly be prevented from starting up with a jerk.

BRIEF DESCRIPTION OF THE DRAWINGS

Exemplary embodiments of the present invention will be described in detail based on the following figures, wherein.

DETAILED DESCRIPTION

First Exemplary Embodiment

Figure 1:
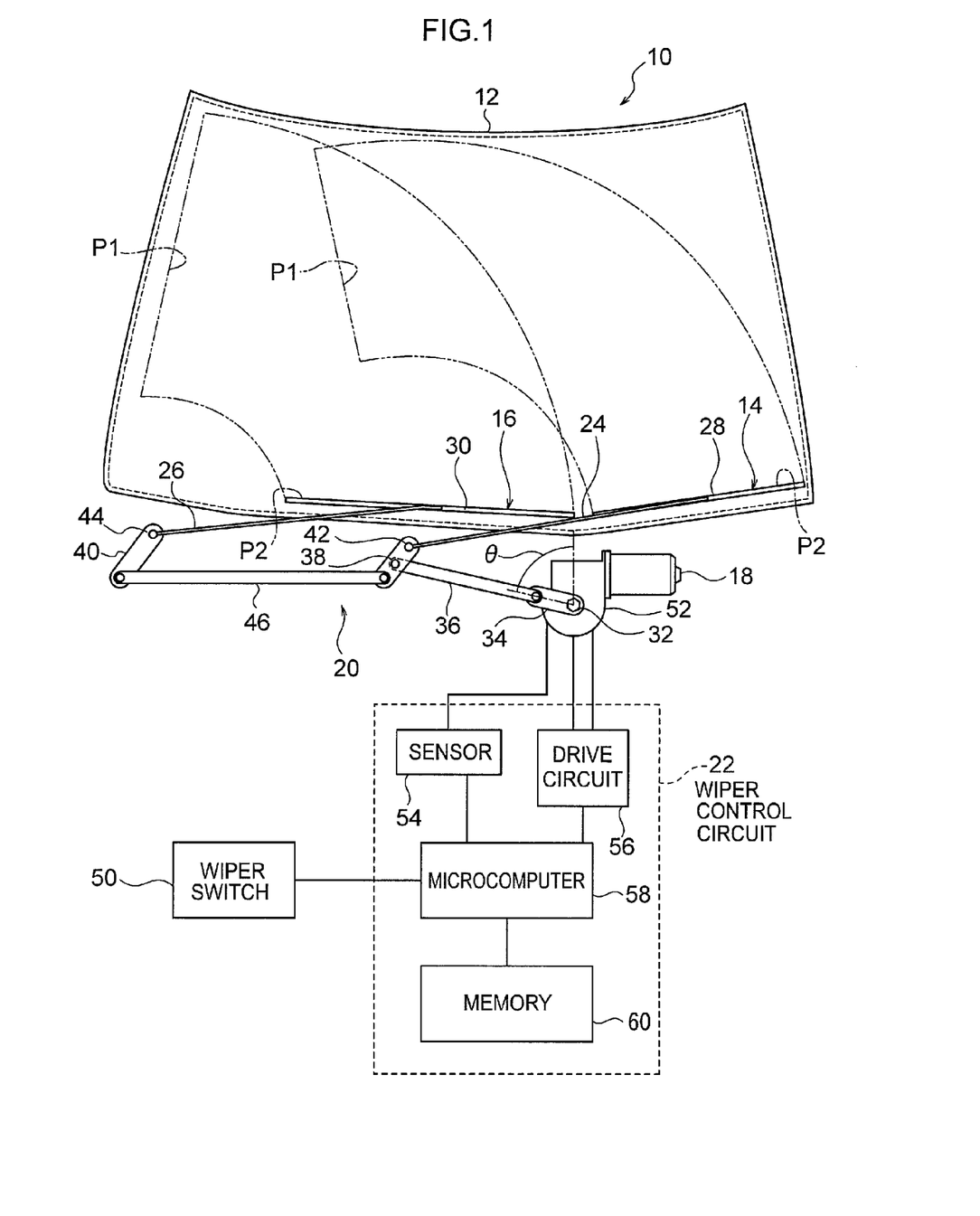
FIG. 1 is a schematic view illustrating a configuration of a wiper device according to a first exemplary embodiment and a second exemplary embodiment of the present invention.

FIG. 1 is a schematic diagram illustrating a configuration of a wiper device 10 according to the present exemplary embodiment. The wiper device 10 is, for example, employed for wiping a front windshield 12 installed in a vehicle such as a car. The wiper device 10 includes a pair of wipers 14 and 16, a wiper motor 18, a link mechanism 20, and a wiper control circuit 22.

The wipers 14 and 16 are respectively configured by wiper arms 24 and 26, and wiper blades 28 and 30. A base end portion of each of the wiper arms 24 and 26 is fixed respectively to pivot shafts 42 and 44, described later, and the wiper blades 28 and 30 are respectively fixed to leading end portions of the wiper arms 24 and 26.

In the wipers 14 and 16, the wiper blades 28 and 30 move to-and-fro over the front windshield 12 accompanying swinging of the wiper arms 24 and 26, and the wiper blades 28 and 30 wipe the front windshield 12.

The wiper motor 18 includes an output shaft 32 that is forward-reverse rotatable through a speed reduction mechanism 52 configured mainly by a worm gear. The link mechanism 20 includes a crank arm 34, a first link rod 36, a pair of pivot levers 38 and 40, the pair of pivot shafts 42 and 44, and a second link rod 46.

One end side of the crank arm 34 is fixed to the output shaft 32, and the other end side of the crank arm 34 is connected to one end side of the first link rod 36 so as to be capable of pivoting. The other end side of the first link rod 36 is connected to a location of the pivot lever 38 towards a different end of the pivot lever 38 to the pivot shaft 42 end of the pivot lever 38, and is connected so as to be capable of pivoting. The two ends of the second link rod 46 are respectively pivotally connected to the different end of the pivot lever 38 to the pivot-shaft-42 end, and to the end of the pivot lever 40 that corresponds to this different end of the pivot lever 38.

The pivot shafts 42 and 44 are pivotally supported by pivot holders that are provided to the vehicle body. The wiper arms 24 and 26 are each respectively fixed through the pivot shafts 42 and 44 to the pivot-shaft-42-44 ends of the pivot levers 38 and 40.

In the wiper device 10 according to the present exemplary embodiment, when the output shaft 32 is forward-reverse rotated with a swing range 0, the rotation force of the output shaft 32 is transmitted through the link mechanism 20 to the wiper arms 24 and 26, and the wiper blades 28 and 30 move to-and-fro over the front windshield 12 between an upper return position P1 and a lower return position P2 accompanying the swinging of the wiper arms 24 and 26 to-and-fro.

In the wiper device 10 according to the present exemplary embodiment, as illustrated in FIG. 1, the crank arm 34 and the first link rod 36 configure a straight line shape when the wiper blades 28 and 30 are positioned in the lower return position P2.

In the wiper device 10 according to the present exemplary embodiment, configuration may be made such that the wiper blades 28 and 30 complete one return journey between the upper return position P1 and the lower return position P2 for every single rotation of the output shaft 32 by adjusting the length of each of the levers in the link mechanism 20 and the positions of each of the links.

The wiper control circuit 22 is connected to the wiper motor 18 in order to control the rotation of the wiper motor 18.

The wiper control circuit 22 of the present exemplary embodiment includes for example a sensor 54 that detects the rotation speed and a rotation angle of the output shaft 32 of the wiper motor 18, and a drive circuit 56 that employs PWM control to generate a current that is supplied to the wiper motor 18 to actuate the wiper motor 18.

When the wiper motor 18 is a brushless DC motor, the drive circuit 56 includes an inverter circuit employing a MOSFET as a switching element, and is controlled by a microcomputer 58, described later, to output current at a specific duty cycle.

Since the wiper motor 18 according to the present exemplary embodiment includes the speed reduction mechanism 52 mentioned above, the rotation speed and rotation angle of the output shaft 32 and the rotation speed and the rotation angle of a wiper motor body are not the same as each other. However, since in the present exemplary embodiment the wiper motor body and the speed reduction mechanism 52 are configured integrally and are not separable from one another, in the following explanation the rotation speed and rotation angle of the output shaft 32 is treated as being the rotation speed and rotation angle of the wiper motor 18.

The sensor 54 is provided inside the speed reduction mechanism 52 of the wiper motor 18. The sensor 54 is configured including a device (for example a Hall IC) that detects a magnetic field (magnetism) of a magnet rotating coupled to the output shaft 32.

The wiper control circuit 22 of the present exemplary embodiment is also configured including a microcomputer 58 and a memory 60. The microcomputer 58 can compute the position of the wiper blades 28 and 30 on the front windshield 12 from the rotation angle of the output shaft 32 detected by the sensor 54, and controls the drive circuit 56 to change the rotation speed of the output shaft 32 according to the computed position of the wiper blades 28 and 30. The memory 60 is stored with data employed in controlling the drive circuit 56. A wiper switch 50 is connected to the microcomputer 58.

The memory 60 is stored with a target speed map that specifies that the rotation speed of the wiper motor 18 is 0 when the wiper blades 28 and 30 are at the upper return position P1 and the lower return position P2, and specifies that the rotation speed of the wiper motor 18 increases as the wiper blades 28 and 30 move from the upper return position P1 and the lower return position P2, and that the rotation speed of the wiper motor 18 is at its greatest when the wiper blades 28 and 30 have reached specific positions between the upper return position P1 and the lower return position P2.

The memory 60 is also stored with a restart initial speed map specifying that the rotation speed of the wiper motor 18 is gradually increased from 0 up to a specific speed when actuation of the wiper motor 18 begins when the wiper blades 28 and 30 are in a stationary state between the upper return position P1 and the lower return position P2.

When the wiper switch 50 has been switched ON, the microcomputer 58 controls the drive circuit 56 according to the target speed map or the restart initial speed map stored in the memory 60.

The wiper switch 50 is a switch that switches power supply from the vehicle battery to the wiper motor 18 ON or OFF.

The wiper switch 50 is switchable between a low speed operation mode selection position that causes the wiper blades 28 and 30 to swing at low speed, a high speed operation mode selection position that causes the wiper blades 28 and 30 to swing at high speed, an intermittent operation mode selection position that causes the wiper blades 28 and 30 to swing intermittently at a specific cycle, and a storage (stationary) mode selection position. The wiper switch 50 outputs to the microcomputer 58 a signal corresponding to the selection position for each mode.

When the signal corresponding to the selection position for each mode has been output from the wiper switch 50 to the wiper control circuit 22, the wiper control circuit 22 then performs control according to the target speed map stored in the memory 60 corresponding to the output signal from the wiper switch 50.

Figure 2:
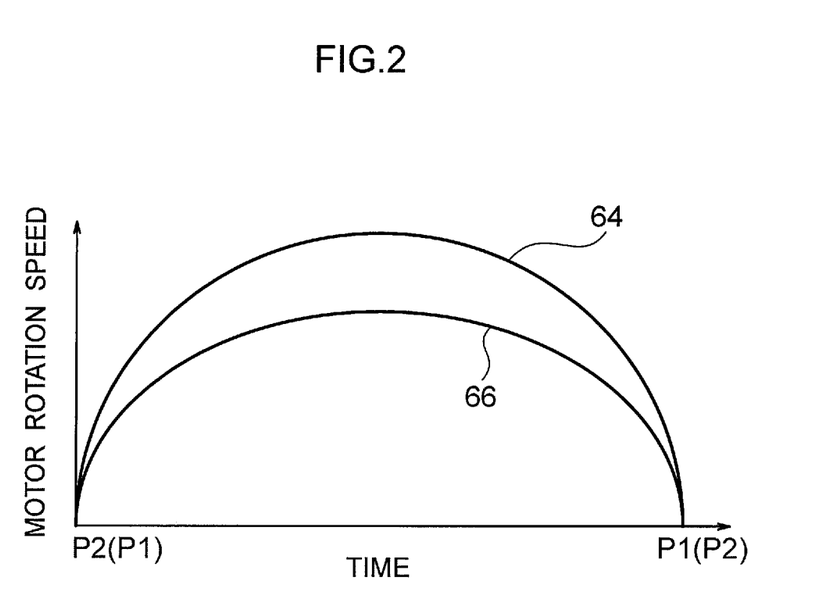
FIG. 2 is a diagram illustrating an example of target speed maps of a wiper device according to the first exemplary embodiment of the present invention.

FIG. 2 is a diagram illustrating examples of target speed maps of the wiper device 10 according to the present exemplary embodiment. The vertical axis in FIG. 2 shows the rotation speed of the wiper motor 18, and the horizontal axis shows time. The time along the horizontal axis is not specific time, but shows the timings of the arrival of the wiper blades 28 and 30 at the return positions P1 and P2, expressed as time along the horizontal axis.

The target speed maps shown in FIG. 2 describe substantially semi-elliptical shaped trajectories as the wiper blades 28 and 30 move from the lower return position P2 (or the upper return position P1) to the upper return position P1 (or the lower return position P2), with the rotation speed of the wiper motor 18 at its greatest at an intermediate point between the lower return position P2 and the upper return position P1.

The rotation speed of the wiper motor 18 is 0 when the wiper blades 28 and 30 are positioned at the lower return position P2 or the upper return position P1. Configuration is made such that the rotation speed of the wiper motor 18 increases as the wiper blades 28 and 30 move from the lower return position P2 or the upper return position P1 towards the intermediate point between the lower return position P2 and the upper return position P1.

Configuration is accordingly made such that whilst the wiper blades 28 and 30 are moving from the lower return position P2 towards the upper return position P1, or from the upper return position P1 towards the lower return position P2, the rotation speed of the wiper motor 18 is increased from 0 so as to reach a maximum speed at the intermediate point between the lower return position P2 and the upper return position P1. After passing the intermediate point, the rotation speed of the wiper motor 18 is then decreased, thereby preventing the wiper blades 28 and 30 from overrunning at the upper return position P1 or the lower return position P2.

Note that in the present exemplary embodiment, the rotation speed of the wiper motor 18 does not have to be at its greatest at the intermediate point between the upper return position P1 and the lower return position P2, and configuration may be made such that the rotation speed of the wiper motor 18 is at its greatest at a given position between the lower return position P2 and the upper return position P1.

The position at which the rotation speed of the wiper motor 18 is at its greatest may be varied as appropriate depending on such factors as the shape of the front windshield 12, the lengths of the wiper blades 28 and 30 and the lengths of the wiper arms 24 and 26.

FIG. 2 shows a high speed operation target speed map 64 in which a high rotation speed between the upper return position P1 and the lower return position P2 is specified for the wiper motor 18, and a low speed operation target speed map 66 in which the rotation speed specified for the wiper motor 18 between the upper return position P1 and the lower return position P2 is lower than that of the high speed operation target speed map 64.

In the present exemplary embodiment, the microcomputer 58 controls the drive circuit 56 such that the rotation speed of the wiper motor 18 follows the low speed operation target speed map 66 when the wiper switch 50 is at the low speed operation mode selection position. The microcomputer 58 controls the drive circuit 56 such that the rotation speed of the wiper motor 18 follows the high speed operation target speed map 64 when the wiper switch 50 is at the high speed operation mode selection position.

Note that in brushless DC motors, output increases as the supplied power is increased, and in particular, rotation speed increases proportionally to the voltage. Therefore in a case in which the wiper motor 18 of the present exemplary embodiment is configured by a brushless DC motor, the rotation speed of the wiper motor 18 can be gradually increased by gradually increasing the duty cycle of the current supplied to the wiper motor 18.

In the present exemplary embodiment, current is intermittently supplied to the wiper motor 18 based on a known control method when the wiper switch 50 is at the intermittent operation mode selection position that causes the wiper blades 28 and 30 to swing intermittently at a specific cycle.

Configuration may also be made such that, separately to the high speed operation target speed map 64 and the low speed operation target speed map 66, a target speed map for intermittent operation is stored in advance in the memory 60 specifying that power is not to be supplied to the wiper motor 18 for a specific duration after the wiper blades 28 and 30 have reached the lower return position P2. The rotation speed of the wiper motor 18 is then controlled according to this intermittent operation target speed map.

Figure 3:
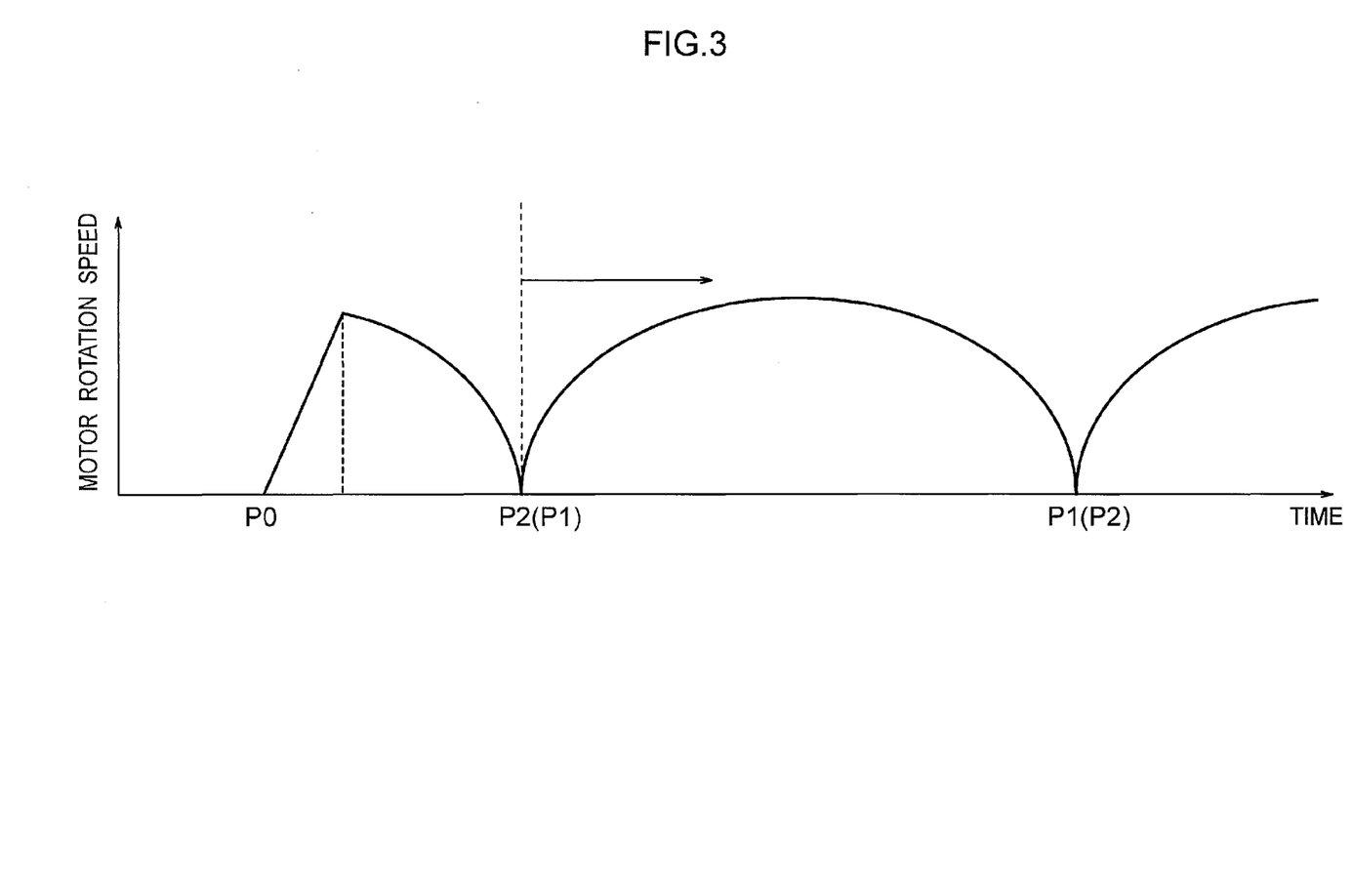
FIG. 3 is a diagram illustrating an example of a restart initial speed map of a wiper device according to the first exemplary embodiment of the present invention.

FIG. 3 is a diagram illustrating an example of a restart initial speed map of the wiper device of the present exemplary embodiment. The vertical axis in FIG. 3 shows the rotation speed of the wiper motor 18, and the horizontal axis shows time. The time along the horizontal axis is not specific time, but shows the timings of the arrival of the wiper blades 28 and 30 at a stationary position P0 and at the return positions P1 and P2, expressed as time along the horizontal axis.

In the example shown in FIG. 3, the wiper motor 18 is caused to rotate whilst gradually increasing the rotation speed up to a specific speed, to move the wiper blades 28 and 30 that have stopped at the position P0 ahead of the lower return position P2 (or the upper return position P1) away from the position P0.

The specific speed may for example be configured as the rotation speed specified by low speed operation target speed map 66 or the high speed operation target speed map 64. In cases in which a faster recovery is desired for the wiper blades, the specific speed may be a higher speed than the rotation speed specified by the high speed operation target speed map 64.

Note that determination that the specific speed has been reached may be made using the rotation speed of the wiper motor 18 detected by the sensor 54, or determination that the rotation speed of the wiper motor 18 has reached the specific speed may be based on timings included in the restart initial speed map.

After the rotation speed of the wiper motor 18 has reached the specific speed, the rotation speed of the wiper motor 18 decreases. The rotation speed of the wiper motor 18 is brought to 0 when the wiper blades 28 and 30 have reached the lower return position P2 (or the upper return position P1), similarly to in the low speed operation target speed map 66 and the high speed operation target speed map 64.

After the wiper blades 28 and 30 have reached the lower return position P2 (or the upper return position P1) from the position P0, the rotation speed of the wiper motor 18 is then controlled according to the low speed operation target speed map 66 or the high speed operation target speed map 64.

Note that whether the rotation speed of the wiper motor 18 is controlled according to the low speed operation target speed map 66 or according to the high speed operation target speed map 64, after the wiper blades 28 and 30 have reached the lower return position P2 (or the upper return position P1) from the position P0, depends on the position of the wiper switch 50.

Figure 4:
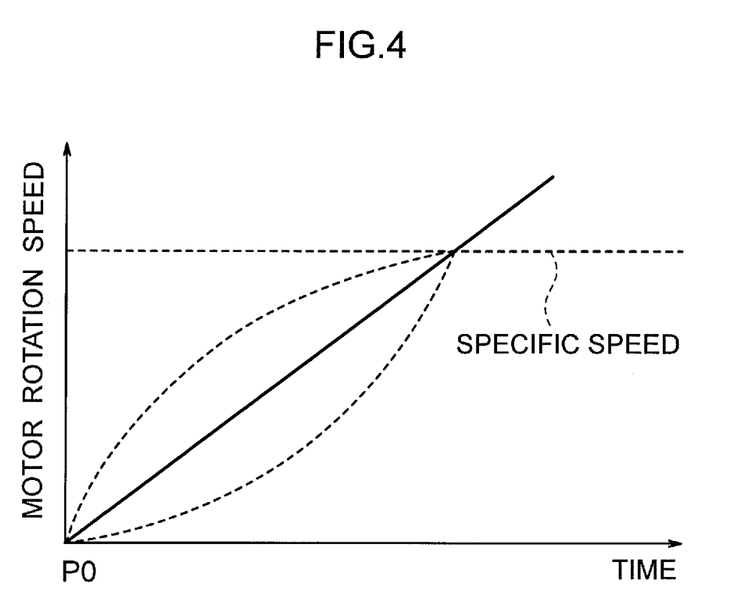
FIG. 4 is a diagram illustrating a permissible range for increasing rotation speed in a wiper device according to the first exemplary embodiment and the second exemplary embodiment of the present invention.

The increase in rotation speed of the wiper motor 18 according to the restart initial speed map in FIG. 3 is linear, however the increase in rotation speed may be expressed by a somewhat curved line, as shown by the broken lines in FIG. 4. FIG. 4 illustrates a permissible range for the increase in the rotation speed of the wiper motor of the wiper device of the present exemplary embodiment.

The duty cycle of the current in the PWM control of the drive circuit 56 is varied in a linear fashion in order to linearly increase the rotation speed of the wiper motor 18, as shown by the solid line in FIG. 4. The rotation speed of the wiper motor 18 also changes linearly according to the linearly varied duty cycle.

However, sometimes it is not easy to vary the duty cycle of the current in a linear fashion, depending on the characteristics of the drive circuit 56. Moreover, sometimes it is not easy to vary the rotation speed of the wiper motor 18 in a linear fashion even if the duty cycle of the current is varied in a linear fashion, depending on the characteristics of the wiper motor 18.

In such cases, configuration may be made such that the rotation speed of the wiper motor 18 is varied along a curved line, as shown by the broken lines in FIG. 4, provided that the recovery action to the return position does not appear sluggish to a user.

Figure 5:
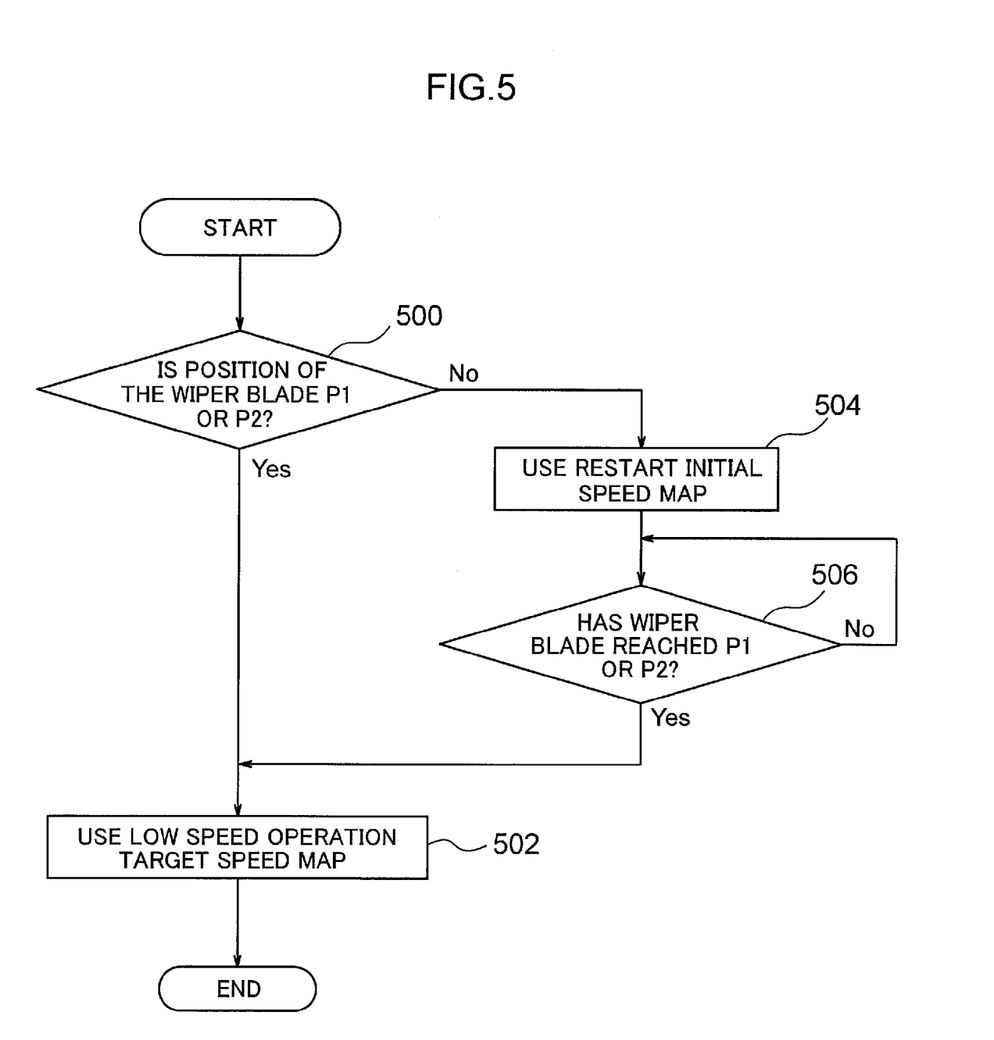
FIG. 5 is a flowchart illustrating control during restart in a wiper device according to the first exemplary embodiment of the present invention.

Explanation follows regarding control performed during restart according to the present exemplary embodiment. FIG. 5 is a flowchart illustrating control during restart in the wiper device of the present exemplary embodiment. Note that FIG. 5 illustrates a case in which the wiper switch 50 has been switched from the storage (stationary) mode selection position to the low speed operation mode selection position.

The wiper switch 50 is switched ON, and then at step 500 the microcomputer 58 determines whether or not the stationary position of the wiper blades 28 and 30 is either the upper return position P1 or the lower return position P2, based on the rotation angle of the output shaft 32 detected by the sensor 54. When the stationary position of the wiper blades 28 and 30 is the upper return position P1 or the lower return position P2, at step 502 the rotation speed of the wiper motor 18 is controlled using the low speed operation target speed map 66.

When the stationary position of the wiper blades 28 and 30 is neither the upper return position P1 nor the lower return position P2 at step 500, at step 504 the rotation speed of the wiper motor 18 is controlled using the restart initial speed map.

At step 506, determination is made as to whether or not the wiper blades 28 and 30 have reached the upper return position P1 or the lower return position P2.

When affirmative determination is made at step 506, processing transitions to step 502, after which the rotation speed of the wiper motor 18 is controlled using the low speed operation target speed map 66.

Note that when the wiper switch 50 is switched from the storage (stationary) mode selection position to the high speed operation mode selection position, processing is similar to that illustrated in FIG. 5 with the exception that the high speed operation target speed map 64 is used at step 502, and so explanation thereof is omitted.

As described above, in the present exemplary embodiment the rotation speed of the wiper motor 18 is gradually increased using the restart initial speed map when the wiper blades 28 and 30 are restarted after stopping partway across the front windshield 12. The wiper arms can accordingly be prevented from starting up with a jerk, and the wiper motor can be controlled such that the recovery action of the wiper arms to the return position does not appear sluggish to the user.

Moreover, in the present exemplary embodiment, the rate of increase of the restart initial speed map may be varied according to the stationary position of the wiper blades 28 and 30.

Figure 6:
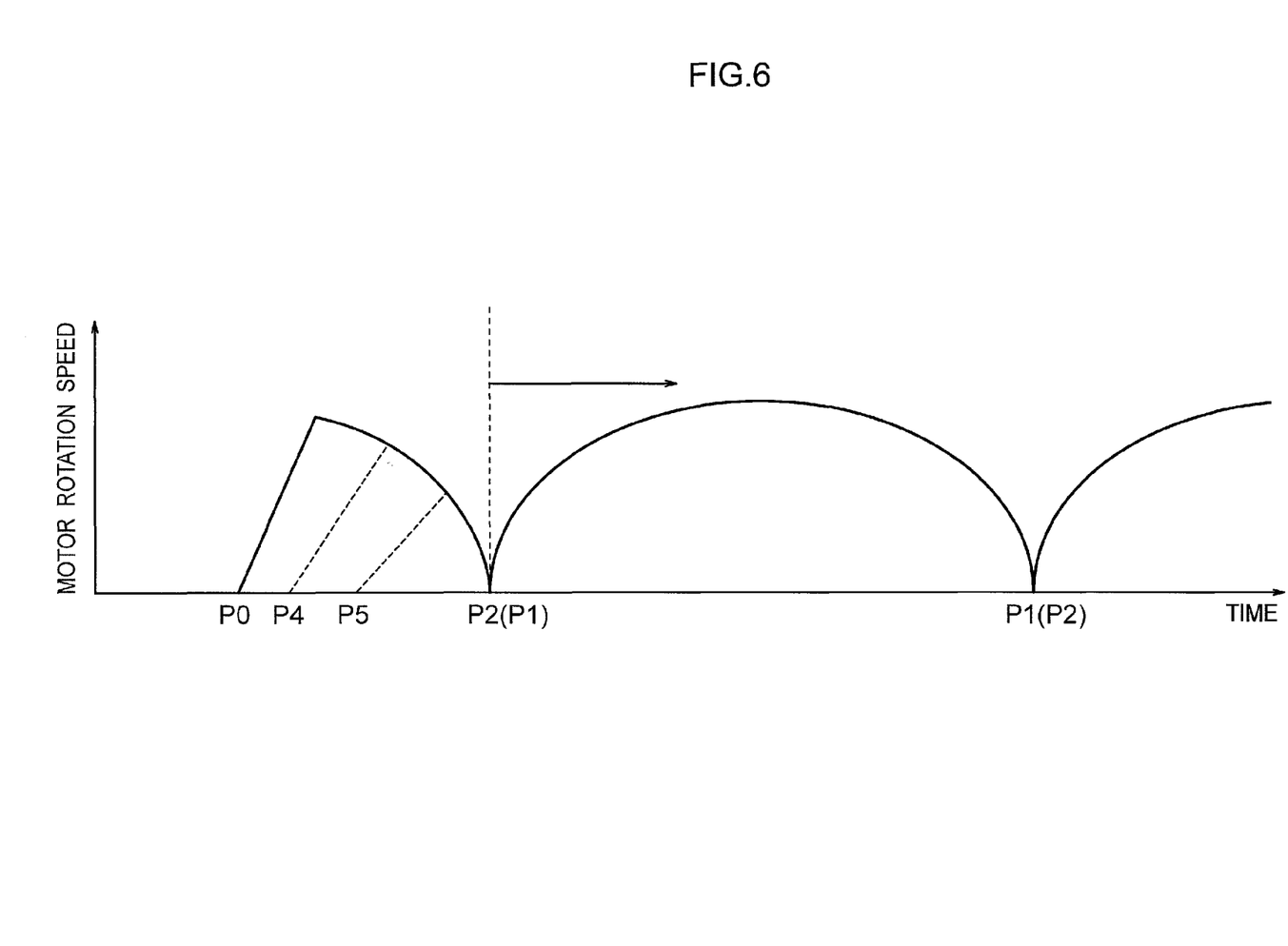
FIG. 6 is a diagram illustrating a case in which the rate of increase in speed of a restart initial speed map varies according to the stationary position of a wiper blade in a wiper device according to the first exemplary embodiment of the present invention.

FIG. 6 is a diagram illustrating an example in which the rate of increase in speed of the restart initial speed map is varied according to the stationary position of the wiper blades in the wiper device according to the present exemplary embodiment.

In FIG. 6, when the stationary position of the wiper blades 28 and 30 is a position P4 that is closer to the lower return position P2 (or the upper return position P1) than the position P0, the slope of the linear portion illustrated by a broken line is gentler than when at the position P0, so the rate of increase in the rotation speed of the wiper motor 18 is lower than that for the position P0.

Moreover, in the case of a position P5 that is even closer to the lower return position P2 (or the upper return position P1), the rate of increase of the rotation speed of the wiper motor 18 is lower than that for the position P4.

The wiper blades 28 and 30 can accordingly be prevented from overrunning beyond the return positions due to thus configuring the rate of increase of the rotation speed of the wiper motor 18 so as to become lower the closer the stationary position of the wiper blades 28 and 30 to the upper return position P1 or the lower return position P2.

In the present exemplary embodiment, configuration may be made with a specific number of regions set across the front windshield 12, with restart initial speed maps each having different rates of increase in rotation speed corresponding to each of the regions as shown in FIG. 6, and with the rotation speed of the wiper motor 18 being controlled using the restart initial speed map corresponding to the region of the front windshield 12 under which the stationary position of the wiper blades 28 and 30 falls.

Note that in the present exemplary embodiment, the high speed operation target speed map, the low speed operation target speed map and the restart initial speed map specify the rotation speed of the wiper motor 18. However, each of the maps may specify variations in the duty cycle of the current generated by drive circuit 56 using PWM control.

Control of the current can be simplified when the duty cycle of the generated current is directly specified in each of the maps than when the rotation speed of the wiper motor 18 is specified.

Second Exemplary Embodiment

Explanation follows regarding a wiper device according to a second exemplary embodiment of the present invention. Elements common to the first exemplary embodiment are allocated the same reference numerals, and explanation thereof is omitted.

The memory 60 illustrated in FIG. 1 is stored with a target speed map specifying the rotation speed of the wiper motor 18 according to the position of the wiper blades 28 and 30 between the upper return position P1 and the lower return position P2.

The memory 60 is further stored with a restart target speed map that specifies a lower rotation speed of the wiper motor 18 between the upper return position P1 and the lower return position P2 than in the target speed map mentioned above.

When the wiper switch 50 is switched ON, the microcomputer 58 controls the drive circuit 56 according to the target speed map or the restart target speed map that are each stored in the memory 60.

Figure 7:
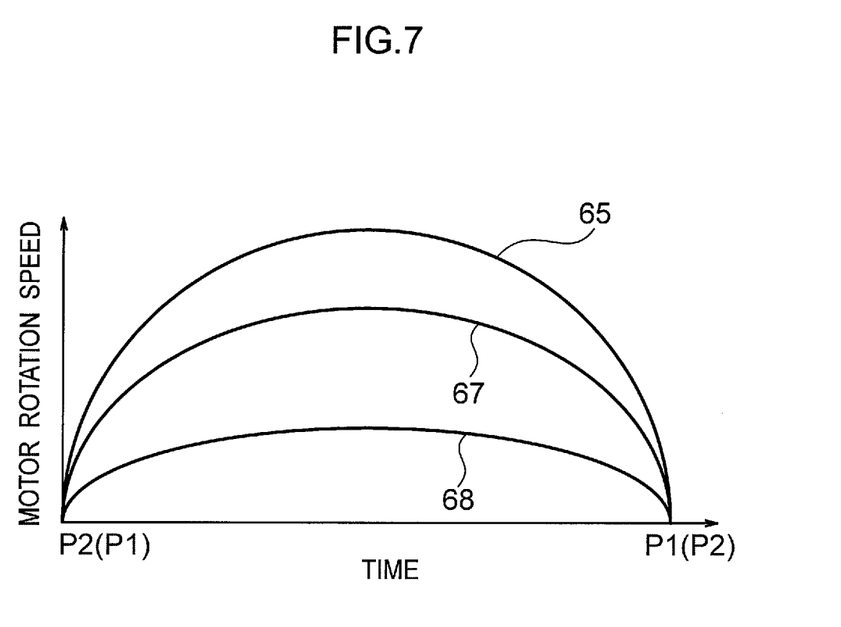
FIG. 7 is a diagram illustrating an example of target speed maps and a restart target speed map of a wiper device according to the second exemplary embodiment of the present invention.

FIG. 7 illustrates an example of the target speed map and the restart target speed map of the wiper device of the present exemplary embodiment. The vertical axis in FIG. 7 shows the rotation speed of the wiper motor 18, and the horizontal axis shows time. The time of the horizontal axis is not specific time, but timings are shown of the arrival of the wiper blades 28 and 30 at the return positions P1 and P2, expressed as time along the horizontal axis.

FIG. 7 illustrates: a high speed operation target speed map 65 that specifies the highest rotation speed for the wiper motor 18 between the upper return position P1 and the lower return position P2; a low speed operation target speed map 67 that specifies a lower rotation speed for the wiper motor 18 between the upper return position P1 and the lower return position P2 than the high speed operation target speed map 65; and a restart target speed map 68 that specifies a lower rotation speed for the wiper motor 18 between the upper return position P1 and the lower return position P2 than the low speed operation target speed map 67.

In FIG. 7, the high speed operation target speed map 65 and the low speed operation target speed map 67 describe substantially semi-elliptical trajectories with the rotation speed of the wiper motor 18 at its greatest at an intermediate point between the lower return position P2 and the upper return position P1 as the wiper blades 28 and 30 move from the lower return position P2 (or the upper return position P1) to the upper return position P1 (or the lower return position P2).

The rotation speed of the wiper motor 18 is 0 when the wiper blades 28 and 30 are positioned at the lower return position P2 or the upper return position P1. Configuration is made such that the rotation speed of the wiper motor 18 increases as the wiper blades 28 and 30 move from the lower return position P2, or the upper return position P1, towards the intermediate point between the lower return position P2 and the upper return position P1.

The rotation speed of the wiper motor 18 is accordingly increased from 0 to a maximum speed at the intermediate point between the lower return position P2 and the upper return position P1 as the wiper blades 28 and 30 move from the lower return position P2 towards the upper return position P1, or from the upper return position P1 towards the lower return position P2. The rotation speed of the wiper motor 18 is the decreased after the wiper blades 28 and 30 have passed the intermediate point. The wiper blades 28 and 30 can accordingly be prevented from overrunning at the upper return position P1 or the lower return position P2.

Note that in the present exemplary embodiment, the rotation speed of the wiper motor 18 need not be at its greatest at the intermediate point between the lower return position P2 and the upper return position P1, and configuration may be made such that the rotation speed of the wiper motor 18 is at its greatest at a given position between the lower return position P2 and the upper return position P1.

The position at which the rotation speed of the wiper motor 18 is at its greatest may be varied as appropriate according to such factors as the shape of the front windshield 12, the lengths of the wiper blades 28 and 30 and the lengths of the wiper arms 24 and 26.

Note that as long as the restart target speed map 68 specifies a lower speed than the low speed operation target speed map 67, the position between the upper return position P1 and the lower return position P2 at which the rotation speed of the wiper motor 18 is at its greatest is not particularly limited.

The microcomputer 58 of the present exemplary embodiment controls the drive circuit 56 such that the rotation speed of the wiper motor 18 follows the low speed operation target speed map 67 when the wiper switch 50 is at the low speed operation mode selection position. Moreover, the microcomputer 58 controls the drive circuit 56 such that the rotation speed of the wiper motor 18 follows the high speed operation target speed map 65 when the wiper switch 50 is at the high speed operation mode selection position.

Note that in brushless DC motors, the rotation speed increases proportionally to voltage. Therefore when the wiper motor 18 of the present exemplary embodiment is a brushless DC motor, the rotation speed of the wiper motor 18 can be increased by increasing the duty cycle of the current supplied to the wiper motor 18.

In the present exemplary embodiment, a current is intermittently supplied to the wiper motor 18 based on a known control method that causes the wiper blades 28 and 30 to swing intermittently at a specific cycle when the wiper switch 50 is at an intermittent operation mode selection position.

Configuration may also be made such that, separately to the high speed operation target speed map 65, the low speed operation target speed map 67 and the restart target speed map 68, a target speed map for intermittent operation that specifies that power is not to be supplied to the wiper motor 18 for a specific duration after the wiper blades 28 and 30 have reached the lower return position P2 is stored in advance in the memory 60. The rotation speed of the wiper motor 18 is then controlled according to this intermittent operation target speed map.

Figure 8:
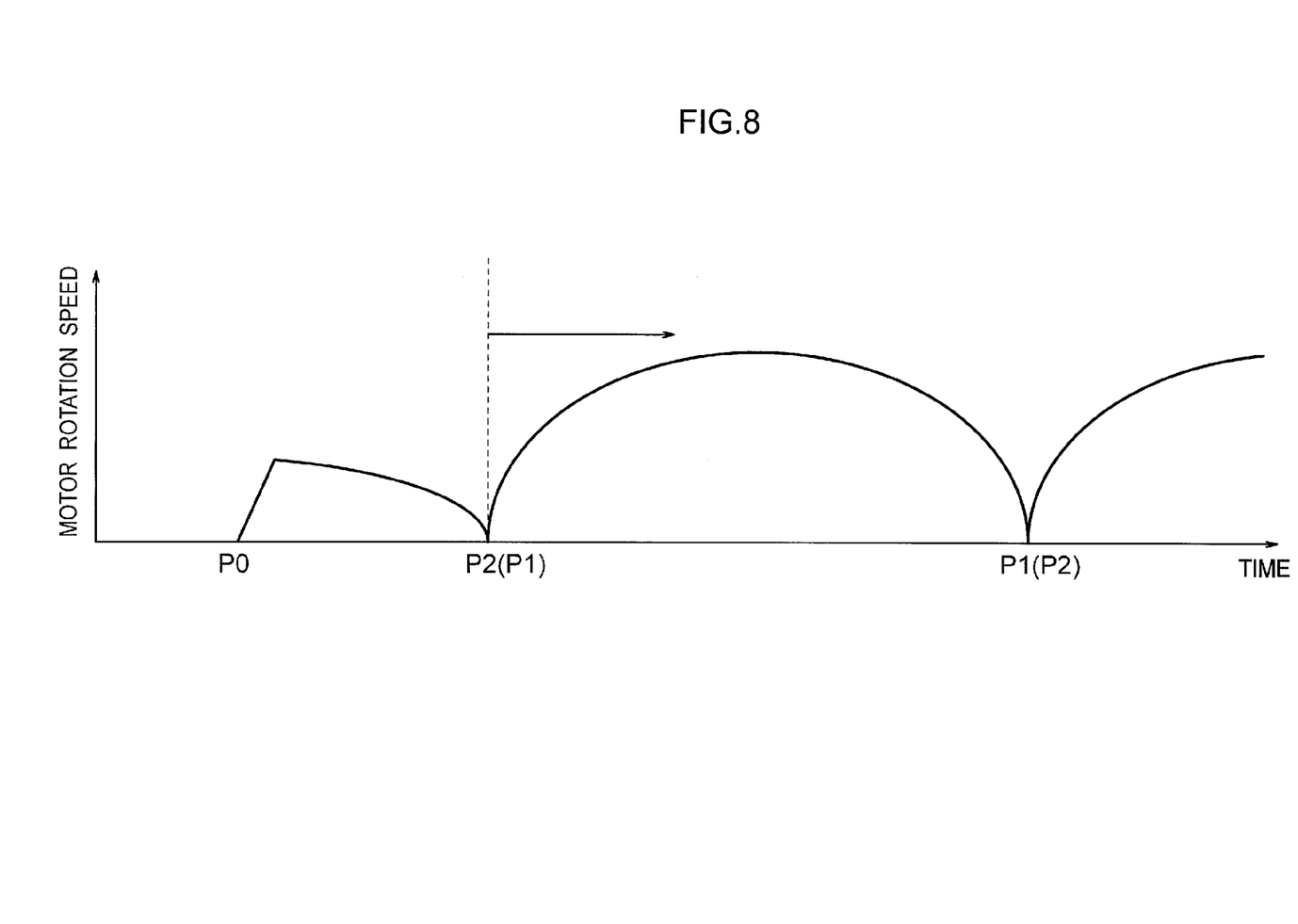
FIG. 8 is a diagram illustrating an example of a restart target speed map of a wiper device according to the second exemplary embodiment of the present invention.

FIG. 8 illustrates an example of a restart target speed map of the wiper device of the present exemplary embodiment. The vertical axis in FIG. 8 shows the rotation speed of the wiper motor 18, and the horizontal axis shows time. The time of the horizontal axis is not specific time, but timings are shown of the arrival of the wiper blades 28 and 30 at a stationary position P0 or at the return positions P1 or P2, expressed as time along the horizontal axis.

In the example shown in FIG. 8, the microcomputer 58 controls the rotation speed of the wiper motor 18 according to the restart target speed map 68 to move the wiper blades 28 and 30 that have stopped at the position P0 ahead of the lower return position P2 (or the upper return position P1) away from the position P0.

In FIG. 8, the rotation speed of the wiper motor 18 from the position P0 to the lower return position P2 (or the upper return position P1) is specified low, so as to prevent jerky wiper action.

As shown in FIG. 8, the rotation speed of the wiper motor 18 is decreased upon nearing the lower return position P2 (or the upper return position P1). The rotation speed of the wiper motor 18 becomes 0 when the wiper blades 28 and 30 reach the lower return position P2 (or the upper return position P1).

The rotation speed of the wiper motor 18 is controlled according to the low speed operation target speed map 67 or the high speed operation target speed map 65 after the wiper blades 28 and 30 have reached the lower return position P2 (or the upper return position P1) from the position P0.

Note that whether the rotation speed of the wiper motor 18 is controlled according to the low speed operation target speed map 67 or the high speed operation target speed map 65, after the wiper blades 28 and 30 have reached the lower return position P2 (or the upper return position P1) from the position P0, depends on the position of the wiper switch.

The increase in rotation speed from the position P0 is linear in FIG. 8, however the increase in rotation speed may express a somewhat curved line, as shown by the broken lines in FIG. 4.

On starting rotation of the wiper motor 18, it is preferable for the rotation speed to increase gradually as shown by the solid line in FIG. 4, so that the user is not disconcerted by jerky wiper action.

However, sometimes it is not easy to achieve a linear increase in the rotation speed of the wiper motor 18, depending on the characteristics of the wiper motor 18.

In such cases, configuration may be made such that the rotation speed of the wiper motor 18 varies along a curved line, as shown by the broken lines in FIG. 4, provided that the recovery action to the return position appears natural to the user.

Figure 9:
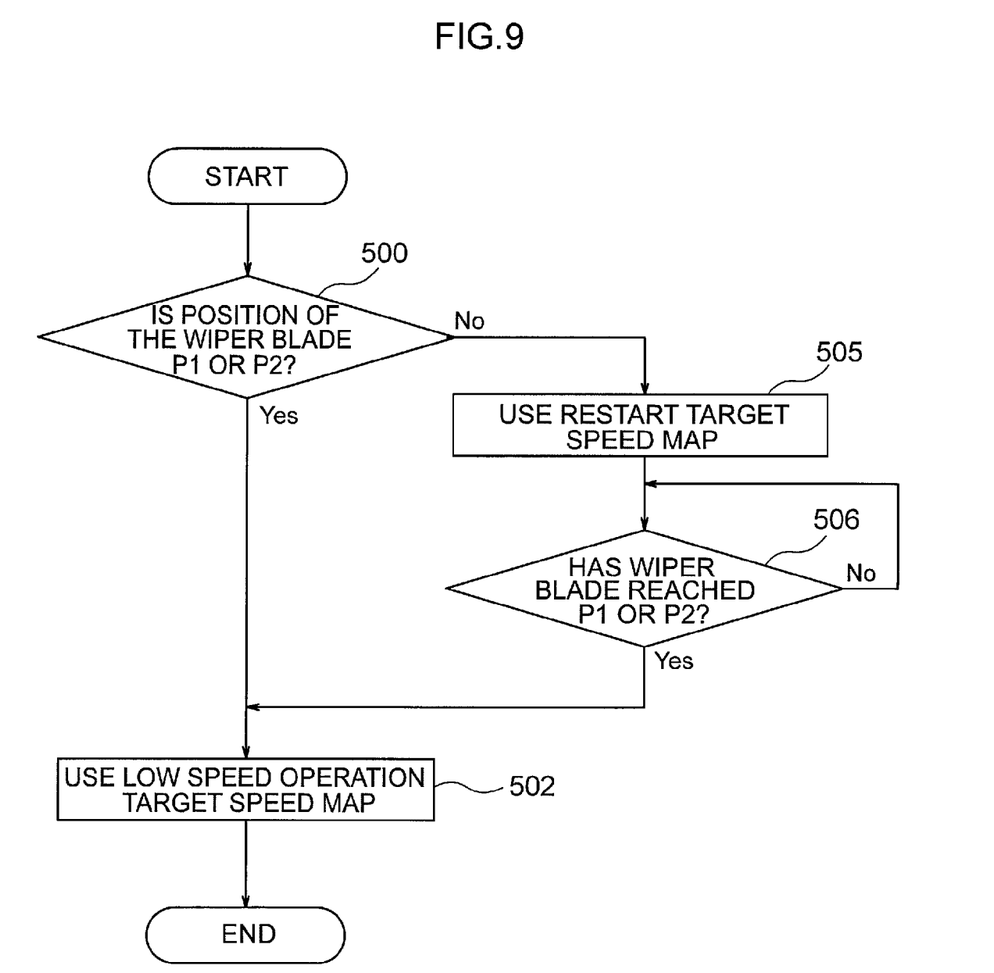
FIG. 9 is a flowchart illustrating control during restart in a wiper device according to the second exemplary embodiment of the present invention.

Explanation follows regarding control performed during restart according to the present exemplary embodiment. FIG. 9 is a flowchart illustrating control during restart in the wiper device of the present exemplary embodiment. Note that FIG. 9 illustrates a case in which the wiper switch 50 is switched from the storage (stationary) mode selection position to the low speed operation mode selection position. Control is substantially the same as the control during a restart in the first exemplary embodiment illustrated in FIG. 5, however differs in the respect that step 505 is performed instead of step 504 shown in FIG. 5.

The wiper switch 50 is switched ON, and then at step 500 the microcomputer 58 determines whether or not the stationary position of the wiper blades 28 and 30 is either of the upper return position P1 or the lower return position P2 based on the rotation angle of the output shaft 32 detected by the sensor 54. When the stationary position of the wiper blades 28 and 30 is either the upper return position P1 or the lower return position P2, at step 502 the rotation speed of the wiper motor 18 is controlled using the low speed operation target speed map 66.

When at step 500 the stationary position of the wiper blades 28 and 30 is neither the upper return position P1 nor the lower return position P2, the rotation speed of the wiper motor 18 is controlled using the restart target speed map 68 at step 505.

At step 506, determination is made as to whether or not the wiper blades 28 and 30 have reached the upper return position P1 or the lower return position P2.

When affirmative determination is made at step 506, processing transitions to step 502, after which the rotation speed of the wiper motor 18 is then controlled using the low speed operation target speed map 67.

Note that in a case in which the wiper switch 50 is switched from the storage (stationary) mode selection position to the high speed operation mode selection position, processing is similar to that illustrated in FIG. 9 with the exception that the high speed operation target speed map 65 is used at step 502, and so explanation thereof is omitted.

As described above, in the present exemplary embodiment the rotation speed of the wiper motor 18 is controlled using the restart target speed map 68 that causes the wiper motor 18 to be rotated at low speed when the wiper blades 28 and 30 are restarted after stopping partway across the front windshield 12. After the wiper blades 28 and 30 have reached the upper return position P1 or the lower return position P2, control switches over to use for example the low speed operation target speed map 66, with this switching over of the control based on whether or not the wiper blades have reached the upper return position or the lower return position.

The determination as to whether or not the wiper blades have reached the upper return position or the lower return position is processing that can be performed even on a low cost microcomputer. A low cost wiper device can accordingly be provided that prevents the wiper arms from starting up with a jerk when they are restarted after the wiper blades have stopped partway across the window glass of a front windshield.

Note that in the present exemplary embodiment, the rotation speed of the wiper motor 18 is specified in the high speed operation target speed map, the low speed operation target speed map and the restart target speed map, however configuration may be made such that each of the maps specifies changes in the duty cycle of the current generated by the drive circuit 56 using PWM control.

Control of the current can be simplified when the duty cycle of the generated current is directly specified in each of the maps than when the rotation speed of the wiper motor 18 is specified.

What is claimed is:

1. A wiper device comprising:
   a wiper motor that swings a wiper blade that is coupled to the wiper motor through a wiper arm to-and-fro over a window pane between an upper return position and a lower return position;
   a drive component that gradually increases power supplied to the wiper motor until the rotation speed of the wiper motor reaches a specific speed when the wiper motor has been restarted from a stationary state of the wiper blade between the upper return position and the lower return position;
   a storage component that is stored with a target speed map that specifies a rotation speed of the wiper motor according to the position of the wiper blade, and that is stored with a restart initial speed map that specifies to gradually increase the rotation speed of the wiper motor from 0 to the specific speed;
   a detection component that detects a rotation speed and a rotation angle of the wiper motor;
   a wiper switch that is input with an instruction to actuate or stop the wiper motor; and
   a control component that computes a position of the wiper blade on the window pane from a rotation angle of the wiper motor detected by the detection component, and on receipt of an instruction to actuate the wiper motor from the wiper switch,
      when the stationary position of the wiper blade on the window pane is between the upper return position and the lower return position the control component controls the drive component so as to gradually increase the power supplied to the wiper motor from the drive component such that the rotation speed of the wiper motor gradually increases up to the specific speed according to the restart initial speed map, and also,
      after the wiper blade has reached the upper return position or the lower return position the control component controls the drive component such that the rotation speed of the wiper motor becomes a rotation speed according to the target speed map.

2. The wiper device of claim 1, wherein:
   the restart initial speed map has different rates of increase in the rotation speed of the wiper motor according to the stationary position of the wiper blade.

3. The wiper device of claim 2, wherein:
   in the restart initial speed map, the rate of increase in the rotation speed of the wiper motor is less the closer the stationary position of the wiper blade is to the upper return position or the lower return position.

* * * * *